United States Patent
Taynton et al.

(10) Patent No.: US 11,530,288 B2
(45) Date of Patent: Dec. 20, 2022

(54) ANHYDROUS ROUTES TO HIGHLY PROCESSABLE COVALENT NETWORK POLYMERS AND BLENDS

(71) Applicant: Mallinda, Denver, CO (US)

(72) Inventors: Philip Taynton, Morrison, CO (US); Yingdong Luo, San Jose, CA (US); Heather Rubin, Arvada, CO (US); Denis Kissounko, Broomfield, CO (US); Samuel Loob, Parker, CO (US); Sarah Sadowski, Littleton, CO (US)

(73) Assignee: Mallinda, Denver, CO (US)

( * ) Notice: Subject to any disclaimer, the term of this patent is extended or adjusted under 35 U.S.C. 154(b) by 269 days.

(21) Appl. No.: 16/635,710

(22) PCT Filed: Sep. 6, 2019

(86) PCT No.: PCT/US2019/050028
§ 371 (c)(1),
(2) Date: Jan. 31, 2020

(87) PCT Pub. No.: WO2020/051506
PCT Pub. Date: Mar. 12, 2020

(65) Prior Publication Data
US 2020/0247937 A1    Aug. 6, 2020

Related U.S. Application Data

(60) Provisional application No. 62/860,837, filed on Jun. 13, 2019, provisional application No. 62/727,785, filed on Sep. 6, 2018.

(51) Int. Cl.
*C08G 12/06*  (2006.01)
*B29C 70/28*  (2006.01)
(Continued)

(52) U.S. Cl.
CPC .............. *C08G 12/06* (2013.01); *B29C 70/28* (2013.01); *C08J 3/24* (2013.01); *C08J 5/18* (2013.01);
(Continued)

(58) Field of Classification Search
CPC .. C08G 12/06; B29C 70/28; C08J 3/24; C08J 5/18; C08L 61/20; C08L 63/00; C08L 2203/16; C08L 2312/00
(Continued)

(56) References Cited

U.S. PATENT DOCUMENTS 3,291,775 A  *  12/1966  Holm ..................... C08G 59/50
                                                    528/121
5,710,315 A       1/1998  Gallagher
(Continued)

FOREIGN PATENT DOCUMENTS

GB       972988 A  *  10/1964  ......... C08G 59/4042
WO    2019099944 A1     5/2019

OTHER PUBLICATIONS

Philip Taynton, Development of Polyimine-Based Dynamic Covalent Networks: From Malleable Polymers to High-Performance Composites, (2015), entire document (Ph.D. dissertation, University of Colorado at Boulder) (available from ProQuest Dissertations and Theses database).
(Continued)

*Primary Examiner* — David T Karst
(74) *Attorney, Agent, or Firm* — Elevated IP, LLC

(57) ABSTRACT

The present invention generally relates to covalent network polymers prepared from an imine-linked oligomer and an independent crosslinker comprising reactive moieties selected from the group consisting of epoxy, isocyanate, bismaleimide, sulfide, polyurethane, anhydride, polyester and combinations thereof. The covalent network polymers
(Continued)

disclosed herein are advantageously made by anhydrous reactions, which enables the highest known glass transition temperatures to date for this class of materials. Further, the disclosed covalent network polymers can be formed in continuous processes, such as additive manufacturing processes that produce three-dimensional objects or roll-to-roll processes that produce covalent network polymer films or fully cured prepreg in various size formats.

19 Claims, 23 Drawing Sheets

(51) Int. Cl.
    *C08J 5/18*       (2006.01)
    *C08L 63/00*    (2006.01)
    *C08J 3/24*       (2006.01)
    *C08L 61/20*    (2006.01)

(52) U.S. Cl.
    CPC ............... C08L 61/20 (2013.01); C08L 63/00 (2013.01); *C08L 2203/16* (2013.01); *C08L 2312/00* (2013.01)

(58) Field of Classification Search
    USPC ........................................................ 528/266
    See application file for complete search history.

(56) References Cited

U.S. PATENT DOCUMENTS

| 7,902,141 B2 | 3/2011 | Becker et al. |
| 9,453,099 B2 | 9/2016 | Zhang et al. |
| 2017/0051082 A1 | 2/2017 | Leibler et al. |
| 2017/0237119 A1 | 8/2017 | Zhang et al. |

OTHER PUBLICATIONS

W. Denissen et al., Vinylogous Urethane Vitrimers, Adv. Funct. Mater. (2015), pp. 2451-2457, vol. 25.
International Search Report and Written Opinion for PCT/US2019/050028 dated Nov. 12, 2019.

* cited by examiner

ANHYDROUS ROUTES TO HIGHLY PROCESSABLE COVALENT NETWORK POLYMERS AND BLENDS

CROSS-REFERENCE TO RELATED APPLICATIONS

This application claims the benefit of and priority to U.S. Provisional Patent Application Nos. 62/727,785, filed Sep. 6, 2018, and 62/860,837, filed Jun. 13, 2019, each of which is hereby incorporated by reference in its entirety.

STATEMENT REGARDING FEDERALLY SPONSORED RESEARCH

This invention was made with government support under grant number 1632199 awarded by the National Science Foundation. The government has certain rights in the invention.

BACKGROUND

Dynamic covalent chemistry is a branch of covalent chemistry which, due to its reversible nature, shares much in common with the non-covalent discipline of supramolecular chemistry, which uses a discrete number of molecules as building blocks to create self-assembled systems. Supramolecular concepts can be applied in the formation of dynamic covalent systems to favor short chain (oligomer) polymer formation, long chain polymer formation, or network formation, as desired. In particular, monomer concentration, monomer geometry, and stoichiometric ratios can be selected to achieve a predetermined architecture. For example, low concentrations of monomers in solution generally lead to the preferential formation of short chain species, whereas increasing the concentration of monomer in solution leads to increased polymer chain length. In addition, the selection of monomers with a specific geometry and number of reactive moieties allows for the formation of a desired connection pattern or shape. To illustrate, linear monomers each containing two reactive end groups would react with angular monomers each containing two complementary reactive end groups to form a square (4 linear monomers+4 angular (90°) monomers), a pentagon (5 linear monomers+5 angular (108°) monomer), a hexagon (6 linear monomers+6 angular (120°) monomer), etc. These concepts are well known to polymer chemists and scientists studying phenomenon at the molecular level.

The present disclosure relates specifically to dynamic covalent polymers (DCPs), which comprise covalent bonds having the ability to form and break reversibly when an environmental or chemical stimulus is applied. DCPs are desirable because they combine the robustness of covalent bonds with unique material properties including self-healing, malleability and responsiveness to stimuli. DCPs are also commonly referred to as vitrimers, malleable thermosets and covalent adaptable polymer networks.

When the environmental stimulus applied to some types of DCPs is water, however, strong non-covalent interactions lead to DCP materials with depressed glass transition temperatures and a tendency to plasticize. This phenomenon is particularly troublesome when a condensation reaction is used to form the DCP because water is a byproduct of the reaction, and the water is difficult to remove without creating trapped bubbles or voids within the polymer structure.

SUMMARY

The present invention generally relates to covalent network polymers capable of undergoing dynamic bond formation/breakage that promotes self-healing and malleability. The covalent network polymers disclosed herein are advantageously made by anhydrous reactions, which do not utilize water or produce water as a byproduct. This absence of water increases the glass transition temperature of the covalent network polymers relative to known DCPs, giving the disclosed covalent network polymers the highest known glass transition temperatures to date for this class of materials.

Further, the disclosed covalent network polymers can be formed in a continuous process, such as an additive manufacturing process that produces three-dimensional objects or a roll-to-roll process that produces covalent network polymer films or fully cured prepreg in various size formats.

In an aspect, a covalent network polymer is prepared from an imine-linked oligomer and an independent crosslinker comprising reactive moieties selected from the group consisting of epoxy, isocyanate, bismaleimide, sulfide, polyurethane, anhydride, polyester and combinations thereof.

In an embodiment, an imine-linked oligomer comprises one or more primary and/or secondary and/or tertiary amines and the amines and the crosslinkers are present in a molar ratio between 0.01:1 and 100:1, or between 0.05:1 and 100:1, or between 0.1:1 and 100:1, or between 0.25:1 and 50:1, or between 0.5:1 and 25:1, or between 1.25:1 and 10:1, or between 1.5:1 and 5:1, or between 1.75:1 and 2.5:1, or in a molar ratio of 2:1.

In an embodiment, an imine-linked oligomer comprises between 2 and 1000, or between 2 and 500, or between 2 and 250, or between 2 and 100, or between 3 and 80, or between 4 and 60, or between 5 and 50, or between 5 and 30 repeating units.

In an embodiment, an imine-linked oligomer has a weight average molecular weight between 200 and 100,000 Daltons, or between 300 and 75,000 Daltons, or between 400 and 50,000 Daltons, or between 500 and 35,000 Daltons, or between 750 and 20,000 Daltons, or between 1,000 and 10,000 Daltons.

In an embodiment, a reaction between an imine-linked oligomer and a crosslinker to create a covalent network polymer is anhydrous. For example, in an embodiment, formation of imine-linked oligomers may not be anhydrous, but isolation of the imine-linked oligomers allows the isolated imine-linked oligomers to be combined with a crosslinker(s) in an anhydrous reaction, such as a curing step.

In an embodiment, an imine-linked oligomer is linear or branched.

In an embodiment, an imine-linked oligomer comprises at least one secondary amine within the oligomer backbone.

In an embodiment, an imine-linked oligomer is prepared from a monofunctional or polyfunctional amine and a monofuctional or polyfunctional aldehyde or carbonyl. For example, the polyfunctional aldehyde or carbonyl may be selected from the group consisting of terepthaldehyde, 2,5-diformylfuran, diformylthiophene, diformylpyrrole, diformylimidazole and combinations thereof. In an embodiment, the polyfuntional carbonyl may be selected from the group consisting of aldehyde, ketone, carboxylate esters, amides, enones, anhydrides, imides and combinations thereof. In an embodiment, the polyfunctional aldehyde or carbonyl may be derived from renewable, biological sources.

In an embodiment, the crosslinker is a molecule selected from the group consisting of a novolac resin, a bisphenol (e.g., Bisphenol A (BPA)), a monoglycidyl, diglycidyl or triglycidyl molecule, a N-containing triglycidyl molecule, cresol or an SU-8 photoresist comprising an epoxy, an isocyanate, a bismaleimide, a sulfide, a polyurethane, an anhydride and/or a polyester functional group.

In an embodiment, a covalent network polymer disclosed herein is a vitrimer and/or a thermosetting polymer. In an embodiment, a covalent network polymer is capable of undergoing dynamic bond exchange reactions, even in a cured state. In an embodiment, a covalent network polymer is not irreversibly cured.

In an embodiment, a covalent network polymer disclosed herein is characterized by a glass transition temperature of at least 100° C., or at least 95° C., or at least 90° C. In an embodiment, a covalent network polymer disclosed herein is characterized by a glass transition temperature in a range between 0° C. and 300° C., or between 30° C. and 300° C., or between 50° C. and 300° C., or between 100° C. and 300° C., or between 200° C. and 300° C., or between 250° C. and 300° C., or between 26° C. and 300° C., or between 275° C. and 300° C.

In an aspect, a composite comprises a covalent network polymer prepared from an imine-linked oligomer and an independent crosslinker comprising reactive moieties selected from the group consisting of epoxy, isocyanate, bismaleimide, sulfide, polyurethane, anhydride, polyester and combinations thereof and another material. In an embodiment, the composite is remoldable or is not remoldable. In an embodiment, a composite is impact resistant and/or moisture resistant. In an embodiment, a composite is characterized by a glass transition temperature of at least 100° C., or at least 95° C., or at least 90° C., or at least 85° C., or at least 80° C., or at least 75° C., or at least 70° C., or at least 65° C., or at least 60° C. In an embodiment, a composite is characterized by a glass transition temperature in a range between 50° C. and 300° C., or between 60° C. and 250° C., or between 100° C. and 300° C., or between 200° C. and 300° C., or between 250° C. and 300° C., or between 265° C. and 300° C., or between 275° C. and 300° C.

In an aspect, a covalent network polymer blend is a mixture of a covalent network polymer with another compound such as, but not limited to, a hydrogel, polyvinylchloride (PVC), polylactic acid (PLA), acrylonitrile butadiene styrene (ABS) and the like.

In an aspect, a vehicle part or a component of an electronic device comprises a composite disclosed herein.

In an aspect, a crash energy management (CEM) structure comprises a composite disclosed herein. In an embodiment, a CEM structure comprises low strain fibers, high strain fibers, or a combination of low strain fibers and high strain fibers.

In an aspect, a process for forming a covalent network polymer comprises combining an imine-linked oligomer and a crosslinker having reactive moieties selected from the group consisting of epoxy, isocyanate, bismaleimide, sulfide, polyurethane, anhydride, polyester and combinations thereof.

In an embodiment, the step of combining occurs by mechanical stirring, reactive extrusion, reactive injection molding, slot die coating and/or shear mixing.

In an embodiment, a process for forming a covalent network polymer comprises a step of using the resin to (i) impregnate a woven, non-woven, unidirectional, chopped or shredded fibrous material, (ii) form a film, or (iii) form a three-dimensional object.

In an embodiment, a fibrous material is impregnated by extrusion followed by compaction, pulltrusion, slot die coating, solvent dip impregnation and/or hot melt impregnation.

In an embodiment, a film is a stand-alone film or a film is supported on a release liner or a film is a layer in a multilayered device. In an embodiment, a film is formed by extrusion, slot die coating, gravure coating, Mayer rod coating, slide coating, polishing rod coating and/or lithography.

In an embodiment, a three-dimensional object is formed by injection molding, additive manufacturing, laser cutting and/or CNC machining.

In an embodiment, a process for forming a covalent network polymer comprises curing the covalent network polymer. In an embodiment, curing comprises heating, UV treatment, IR treatment, microwave treatment, and/or addition of a catalyst, accelerant or radical initiator.

In an embodiment, a composite disclosed herein may be joined with another component by: applying localized heat to a contact point(s) between the composite and the other component to generate a weld by dynamic covalent interaction; applying localized ultrasonic energy to a contact point(s) between the composite and the other component; and/or applying localized pressure to a contact point(s) between the composite and the other component. In an embodiment, the other component is metal, thermoplastic, ceramic, glass, covalent network polymer or a combination thereof.

In an embodiment, the step of applying localized heat comprises utilizing convection, radiation, conduction and/or induction. For example, energy may be applied in the form of convection, radiation (e.g., laser, IR, microwave), conduction (e.g., heated press/mold) and/orinduction (e.g., via electrically conductive fibers or conductive additives).

In an embodiment, a process for joining components comprises applying a structural adhesive comprising a covalent network polymer disclosed herein between the components. In an embodiment, the components are metal, thermoplastic, ceramic, glass, covalent network polymer or a combination thereof. In an embodiment, the components are both non-vitrimer components, both vitrimer-containing components, or a combination of non-vitrimer and vitrimer-containing components.

In an aspect, a process for recycling a composite comprising a covalent network polymer disclosed herein comprises: contacting the composite with acid, an additional quantity of imine-linked oligomer, or an additional quantity of the crosslinker to depolymerize the covalent network polymer into a liquid; and physically separating the liquid from the other material in the composite.

BRIEF DESCRIPTION OF THE DRAWINGS

Illustrative embodiments of the present invention are described in detail below with reference to the attached drawings, wherein.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

As used herein, an "imine-linked oligomer" is an oligomer comprising at least one non-terminal imine moeity, such that the imine moiety is within the oligomer backbone.

As used herein, a "moiety" is a part of a molecule.

As used herein, "polyfunctional" is used to describe a molecule comprising at least two designated moieties. For example, a polyfunctional amine comprises at least two amine moieties and a polyfunctional aldehyde or carbonyl comprises at least two aldehyde or carbonyl moieties, respectively. In addition to the designated moieties, polyfunctional molecules may, in some embodiments, contain additional, different moieties.

As used herein, a "crosslinker" is a molecule that chemically reacts with and covalently joins oligomers and/or polymers.

As used herein, a "composite" comprises multiple parts or substances joined in a heterogenous configuration. Composites disclosed herein comprise a covalent network polymer and at least one other material. For example, the covalent network polymer may be layered with the other material, used to impregnate and/or encapsulate the other material, encapsulated by the other material, or otherwise intermingled with the other material.

"Proximal" and "distal" refer to the relative positions of two or more objects, planes or surfaces. For example, an object that is close in space to a reference point relative to the position of another object is considered proximal to the reference point, whereas an object that is further away in space from a reference point relative to the position of another object is considered distal to the reference point.

The terms "direct and indirect" describe the actions or physical positions of one object relative to another object. For example, an object that "directly" acts upon or touches another object does so without intervention from an intermediary. Contrarily, an object that "indirectly" acts upon or touches another object does so through an intermediary (e.g., a third component).

Figure 1:
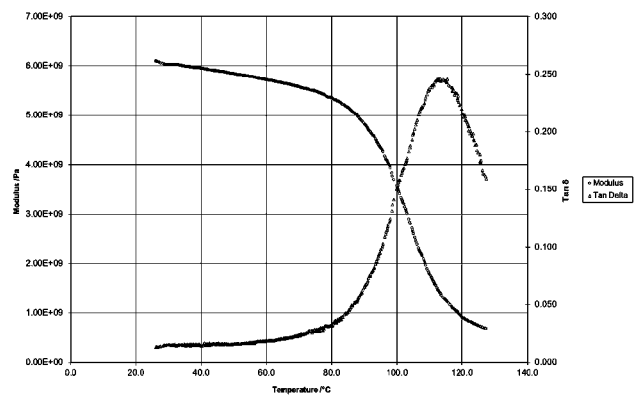
FIG. 1 illustrates the results of Dynamic Mechanical Analysis (DMA) of a dipropylenetriamine+terephthaldehyde imine-linked oligomer cured with a novolac-Poly[(phenyl glycidyl ether)-co-formaldehyde] epoxy crosslinker, according to an embodiment.
Figure 2:
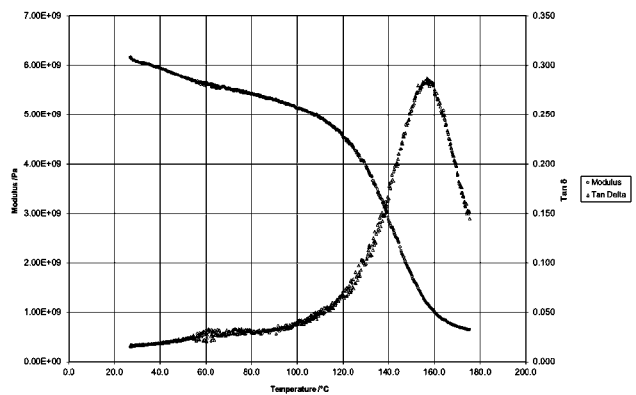
FIG. 2 illustrates the DMA of a dipropylenetriamine+ethylenediamine+terephthaldehyde imine-linked oligomer cured with a novolac-Poly[(phenyl glycidyl ether)-co-formaldehyde] epoxy crosslinker, according to an embodiment.
Figure 3:
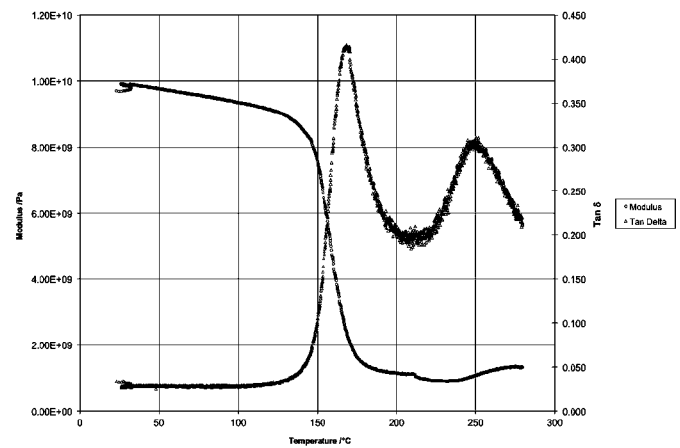
FIG. 3 illustrates the DMA of a 4,4'-oxydianiline+terephthaldehyde imine-linked oligomer cured with a novolac-Poly[(phenyl glycidyl ether)-co-formaldehyde] epoxy crosslinker, according to an embodiment.

FIG. 1, FIG. 2, and FIG. 3 depict the results of Dynamic Mechanical Analysis (DMA) experiments to determine the glass transition temperatures (Tg) of composites formulated with imine-linked oligomers and epoxy-functionalized novolac crosslinkers, according to multiple embodiments. FIG. 1 illustrates the DMA of a dipropylenetriamine+terephthaldehyde imine-linked oligomer cured with a novolac-Poly[(phenyl glycidyl ether)-co-formaldehyde] epoxy crosslinker. FIG. 2 illustrates the DMA of a dipropylenetriamine+ethylenediamine+terephthaldehyde imine-linked oligomer cured with a novolac Poly[(phenyl glycidyl ether)-co-formaldehyde] epoxy crosslinker. FIG. 3 illustrates the DMA of a 4,4'-oxydianiline+terephthaldehyde imine-linked oligomer cured with a novolac-Poly[(phenyl glycidyl ether)-co-formaldehyde] epoxy crosslinker.

Figure 4:
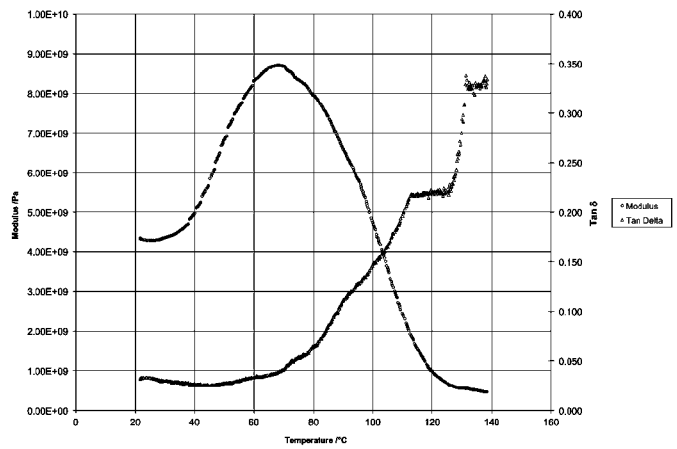
FIG. 4 depicts the results of a DMA experiment to determine Tg of a composite formulated with a diethylenetriamine+terephthaldehyde imine-linked oligomer and an epoxy-functionalized bisphenol A (BPA) crosslinker, according to an embodiment.

FIG. 4 depicts the results of a DMA experiment to determine Tg of a composite formulated with a diethylenetriamine+terephthaldehyde imine-linked oligomer and an epoxy-functionalized bisphenol A (BPA) crosslinker.

Figure 5:
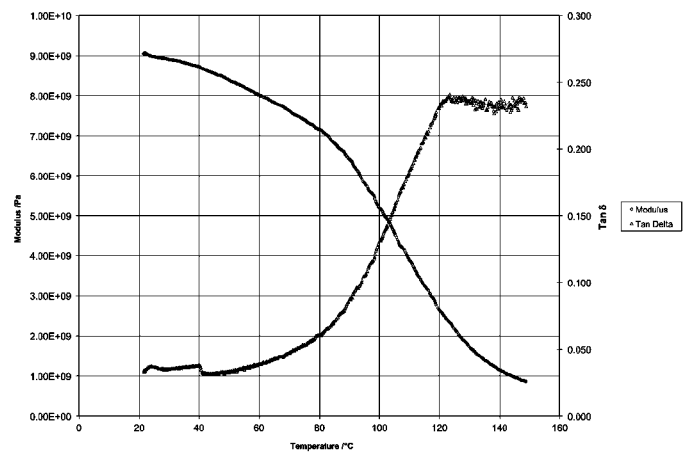
FIG. 5 depicts the results of a DMA experiment to determine Tg of a composite formulated with a diethylenetriamine+terephthaldehyde imine-linked oligomer and a nitrogen containing triglycidyl epoxy crosslinker (N,N-Diglycidyl-4-glycidyloxyaniline), according to an embodiment.

FIG. 5 depicts the results of a DMA experiment to determine Tg of a composite formulated with a diethylenetriamine+terephthaldehyde imine-linked oligomer and a nitrogen containing triglycidyl epoxy crosslinker (N,N-Diglycidyl-4-glycidyloxyaniline).

Figure 6:
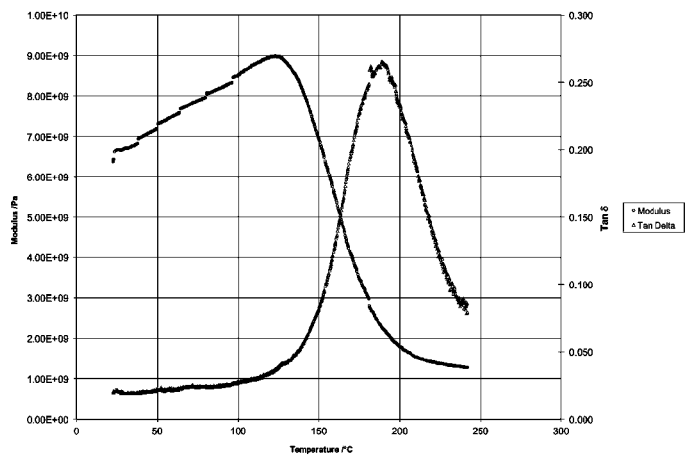
FIG. 6 depicts the results of a DMA experiment to determine Tg of a composite formulated with diethylenetriamine+terephthaldehyde imine-linked oligomer and a high molecular weight (>1 kda) cresol epoxy crosslinker (Poly[(o-cresyl glycidyl ether)-co-formaldehyde], $M_n$ 1080), according to an embodiment.

FIG. 6 depicts the results of a DMA experiment to determine Tg of a composite formulated with diethylenetriamine+terephthaldehyde imine-linked oligomer and a high molecular weight (>1 kda) cresol epoxy crosslinker (Poly[(o-cresyl glycidyl ether)-co-formaldehyde], $M_n$ 1080).

Figure 7:
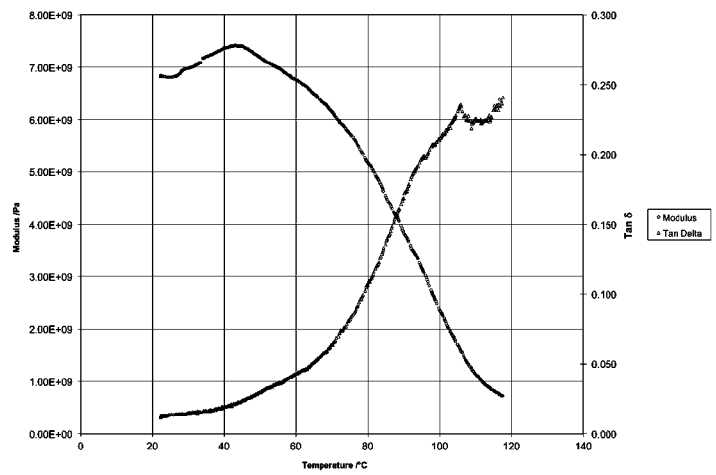
FIG. 7 depicts the results of a DMA experiment to determine Tg of a composite formulated with diethylenetriamine+terephthaldehyde imine-linked oligomer and a low molecular weight (<1 kda) cresol epoxy crosslinker (Poly[(o-cresyl glycidyl ether)-co-formaldehyde], $M_n$ 345), according to an embodiment.

FIG. 7 depicts the results of a DMA experiment to determine Tg of a composite formulated with diethylenetriamine+terephthaldehyde imine-linked oligomer and a low molecular weight (<1 kda) cresol epoxy crosslinker (Poly[(o-cresyl glycidyl ether)-co-formaldehyde], $M_n$ 345).

Figure 8:
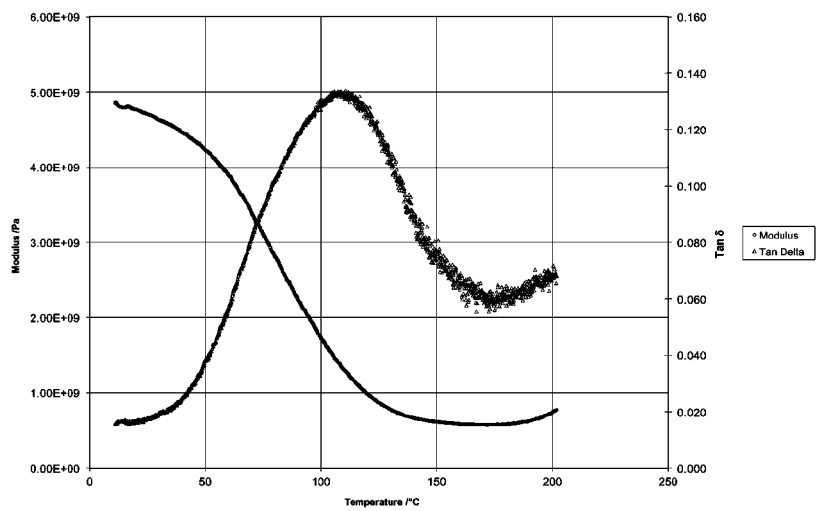
FIG. 8 depicts the results of a DMA experiment to determine Tg of a composite formulated with diethylenetriamine+terephthaldehyde imine-linked oligomer and a triglycidyl epoxy crosslinker (trimethylolpropane triglycidyl ether), according to an embodiment.

FIG. 8 depicts the results of a DMA experiment to determine Tg of a composite formulated with diethylenetriamine+terephthaldehyde imine-linked oligomer and a triglycidyl epoxy crosslinker (trimethylolpropane triglycidyl ether).

Figure 9:
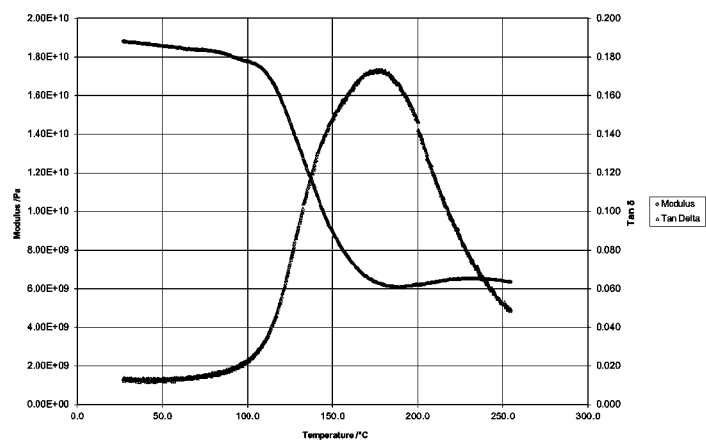
FIG. 9 depicts the results of a DMA experiment to determine Tg of a composite formulated with diethylenetriamine+terephthaldehyde imine-linked oligomer and SU-8 photoresist, according to an embodiment.

FIG. 9 depicts the results of a DMA experiment to determine Tg of a composite formulated with diethylenetriamine+terephthaldehyde imine-linked oligomer and SU-8 photoresist.

Figure 10:
FIG. 10 illustrates a non-limiting range of amine and carbonyl precursors which can be used to prepare imine-linked oligomers, according to multiple embodiments.

FIG. 10 illustrates a non-limiting range of amine and carbonyl precursors which can be used to prepare imine-linked oligomers.

Figure 11:
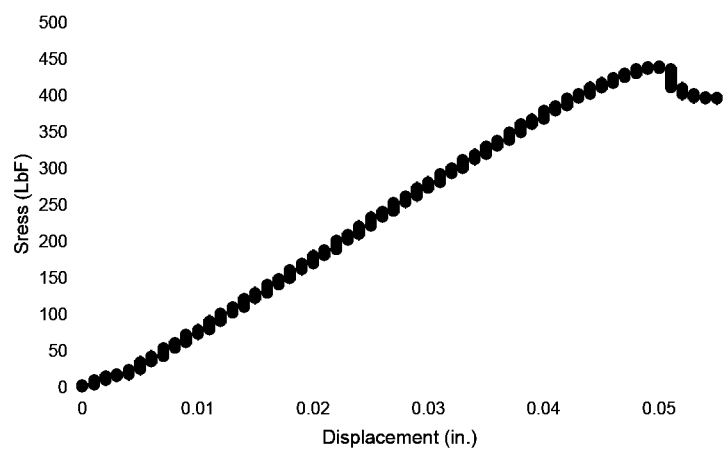
FIG. 11 depicts a short beam shear experiment to determine the shear strength of an 8-ply pre-cured composite, comprised of a diethylene+terephthaldehyde imine-linked oligomer, and a novolac-Poly[(phenyl glycidyl ether)-co-formaldehyde] epoxy crosslinker, combined with 9 oz/sqyd glass twill fabric via solvent-dip impregnation, then cured and formed layer-by-layer in a heat press, according to an embodiment.

FIG. 11 depicts a short beam shear experiment to determine the shear strength of an 8-ply pre-cured composite, comprised of a diethylene+terephthaldehyde imine-linked oligomer, and a novolac-Poly[(phenyl glycidyl ether)-co-formaldehyde] epoxy crosslinker, combined with 9 oz/sqyd glass twill fabric via solvent-dip impregnation, then cured and formed layer-by-layer in a heat press.

Figure 12:
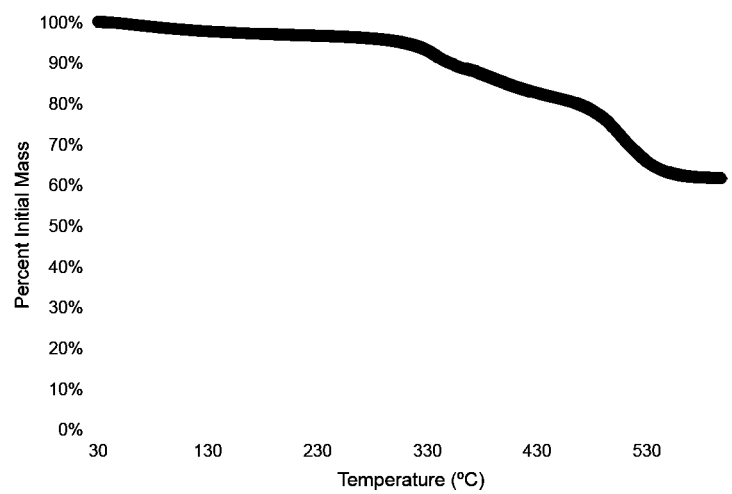
FIG. 12 depicts a Thermal Gravimetric Analysis plot of a composite formulated with a diethylenetriamine+terephthaldehyde imine-linked oligomer and an epoxy functionalized cresol (Poly[(o-cresyl glycidyl ether)-co-formaldehyde], $M_n$ 1080), according to an embodiment.

FIG. 12 depicts a Thermal Gravimetric Analysis plot of a composite formulated with a diethylenetriamine terephthaldehyde imine-linked oligomer and an epoxy functionalized cresol (Poly[(o-cresyl glycidyl ether)-co-formaldehyde], $M_n$ 1080).

Figure 13:
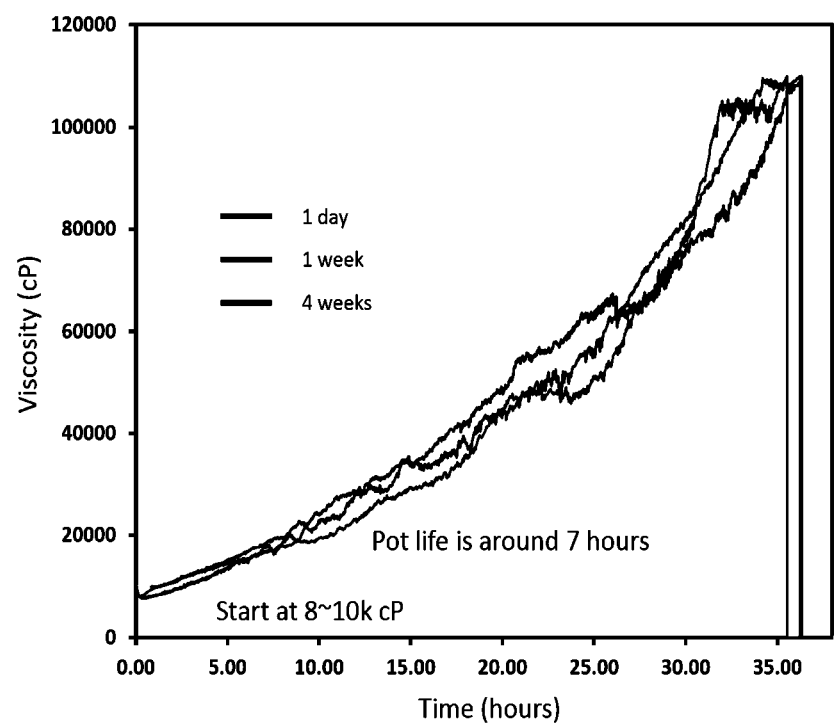
FIG. 13 depicts isothermal (at 100° C.) viscometer data of an uncured neat resin formulated with imine-linked oligomers and an epoxy functionalized crosslinking agent (novolac-Poly[(phenyl glycidyl ether)-co-formaldehyde]), according to an embodiment.

FIG. 13 depicts isothermal (at 100° C.) viscometer data of an uncured neat resin formulated with imine-linked oligomers and an epoxy functionalized crosslinking agent (novolac-Poly[(phenyl glycidyl ether)-co-formaldehyde]). This demonstrates viscosity, pot life, and out life which enable processability for hot-melt resin infusion, reactive extrusion, reactive injection molding, lithography, and other processes.

Figure 14:
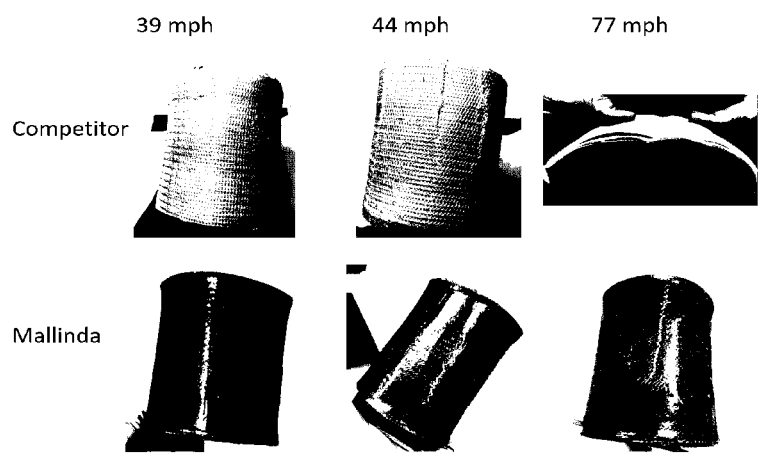
FIG. 14 displays composite (prepared from imine-linked oligomers crosslinked with novolac Poly[(phenyl glycidyl ether)-co-formaldehyde] epoxy crosslinker and 9 oz/sqyd twill weave glass fiber) devices which were molded to shape followed by drop impact testing, according to an embodiment.

FIG. 14 displays composite (prepared from imine-linked oligomers crosslinked with novolac-Poly[(phenyl glycidyl ether)-co-formaldehyde] epoxy crosslinker and 9 oz/sqyd twill weave glass fiber) devices which were molded to shape followed by drop impact testing. The top row displays a competitive impact-absorbing material. The bottom row displays multilayer fiberglass composites that were consolidated and remolded from a flat shape to a curved shape from pre-cured sheet stock. The devices in the bottom row were prepared using resin which was formulated with imine-linked oligomers and an epoxy containing crosslinking agent. The columns left to right display the material samples following a 18 inch, 24 inch, and 72 inch drop respectively of a 10 lb 5 oz weight. The impact energy of these drops is approximately equivalent to 39 mph, 44 mph, and 77 mph baseball impacts respectively. The figure reveals catastrophic damage on the top row, and cosmetic damage on the bottom row.

Figure 15:
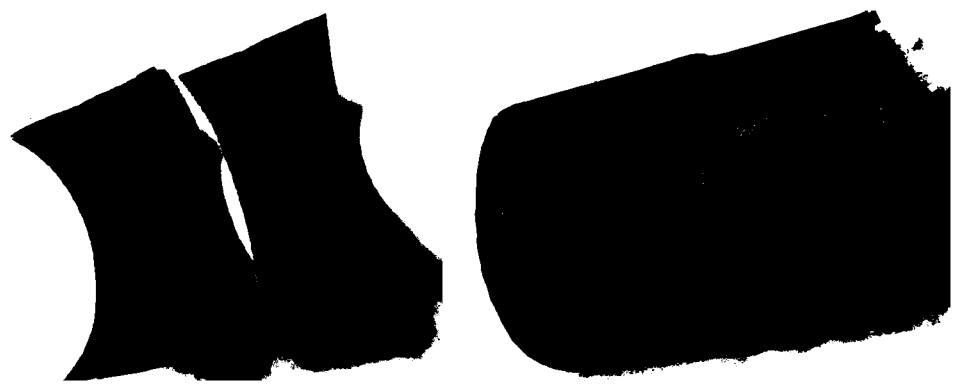
FIG. 15 depicts photographs of the top and bottom view of two remoldable imine-linked, epoxy crosslinked multi-layer covalent network polymer-carbon fiber composite devices layed up with differing fiber directionalities, according to an embodiment.

FIG. 15 depicts photographs of the top and bottom view of two remoldable imine-linked, epoxy crosslinked multilayer covalent network polymer-carbon fiber composite devices layed up with differing fiber directionalities. Both devices are composed of identical layers of woven carbon fiber composites that were consolidated and remolded from a flat shape to a curved shape from pre-cured sheet stock. One device was layed up with one weave direction aligned with, and the other weave direction orthogonal to the molded curvature. The other device was layed up with one weave direction at a +45° angle and the other weave direction at a −45° angle with respect to the molded curvature. The device with 0° and +90° fiber orientations is observed to have delamination and severe wrinkling on the bottom side subsequent to the molding step. The device with +45° and −45° fiber orientation is observed to have minimal wrinkling, and no delamination on the bottom side subsequent to the molding step.

Figure 16:
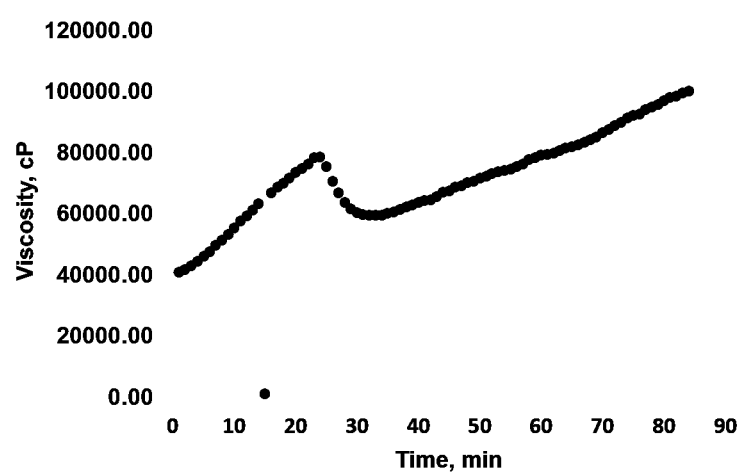
FIG. 16 depicts isothermal (at 100° C.) viscometer data of an uncured neat resin formulated with imine-linked oligomers and a sulfide functionalized crosslinking agent, according to an embodiment.

FIG. 16 depicts isothermal (at 100° C.) viscometer data of an uncured neat resin formulated with imine-linked oligomers and a sulfide functionalized crosslinking agent. This demonstrates viscosity and pot life, which enable processability for hot-melt resin infusion, reactive extrusion, reactive injection molding, lithography, and other processes.

Figure 17:
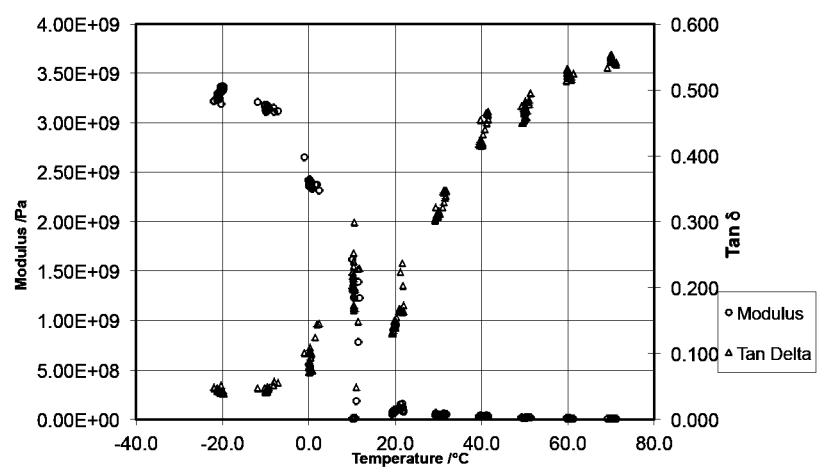
FIG. 17 depicts the dynamic mechanical analysis of a cured resin formulated with imine-linked oligomers and isocyanate functionalized crosslinking agent over a range of temperatures, according to multiple embodiments.

FIG. 17 depicts the dynamic mechanical analysis of a cured resin formulated with imine-linked oligomers and isocyanate functionalized crosslinking agent over a range of temperatures.

Figure 18:
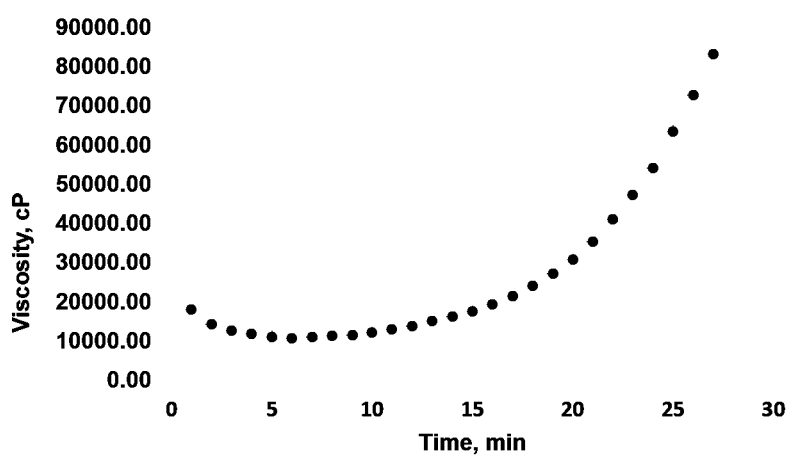
FIG. 18 depicts isothermal (at 100° C.) viscometer data of an uncured neat resin formulated with imine-linked oligomers and a bismaleimide functionalized crosslinking agent, according to an embodiment.

FIG. 18 depicts isothermal (at 100° C.) viscometer data of an uncured neat resin formulated with imine-linked oligomers and a bismaleimide functionalized crosslinking agent. This demonstrates viscosity and pot life, which enable processability for hot-melt resin infusion, reactive extrusion, reactive injection molding, lithography, and other processes.

Figure 19:
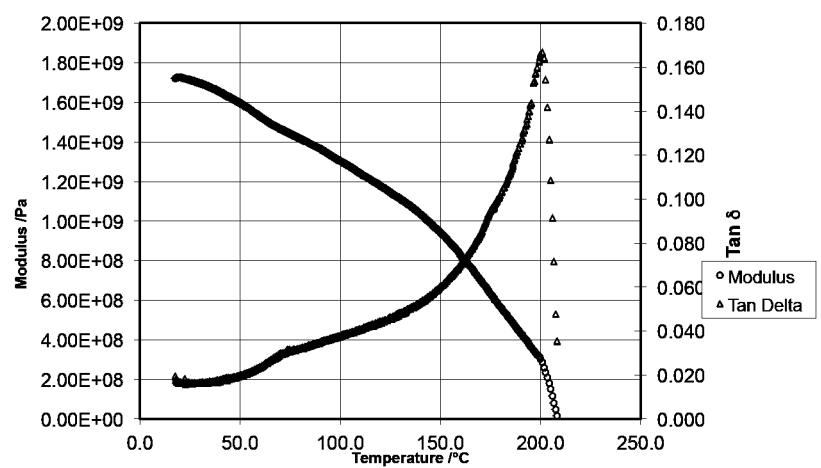
FIG. 19 and FIG. 20 depict dynamic mechanical analysis of cured resins formulated with imine-linked oligomers and bismaleimide functionalized crosslinking agents over a range of temperatures, according to an embodiment.
Figure 20:
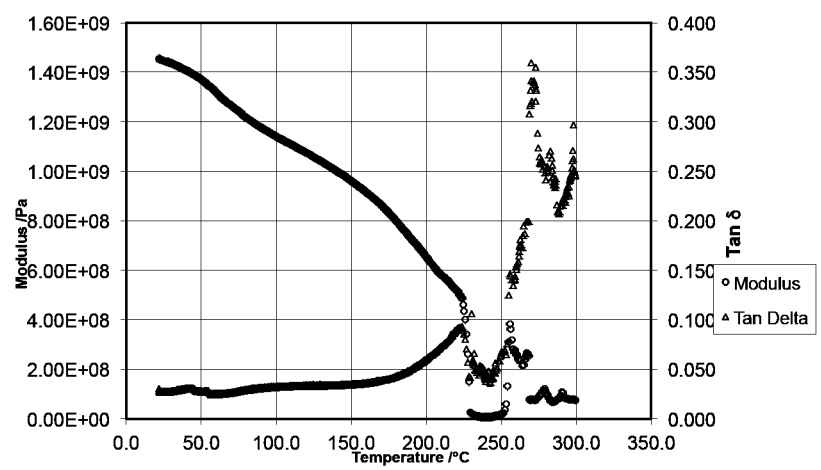

FIG. 19 and FIG. 20 depict dynamic mechanical analysis of cured resins formulated with imine-linked oligomers and bismaleimide functionalized crosslinking agents over a range of temperatures.

Figure 21:
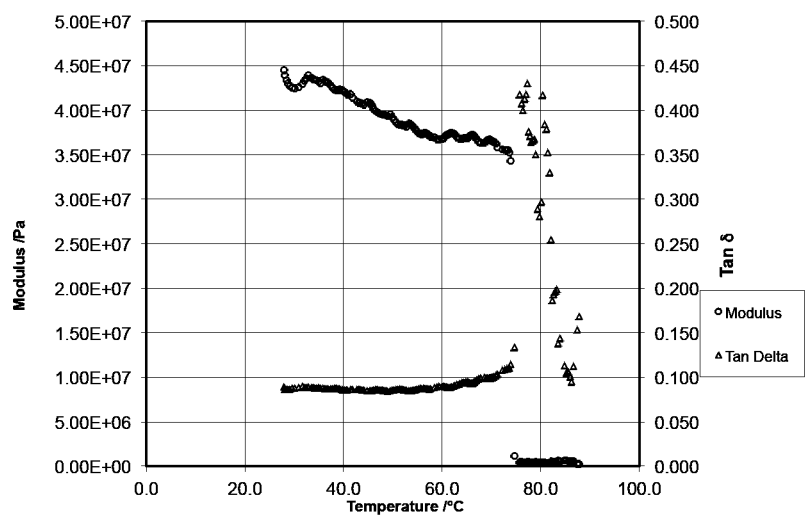
FIG. 21 depicts the dynamic mechanical analysis of a cured resin formulated with imine-linked oligomers and a crosslinking agent, according to an embodiment. The imine-linked oligomers were prepared by combining bioderived 2,5-diformylfuran and diamine precursors.

FIG. 21 depicts the dynamic mechanical analysis of a cured resin formulated with imine-linked oligomers and a crosslinking agent. The imine-linked oligomers were prepared by combining bioderived 2,5-diformylfuran and diamine precursors.

Figure 22:
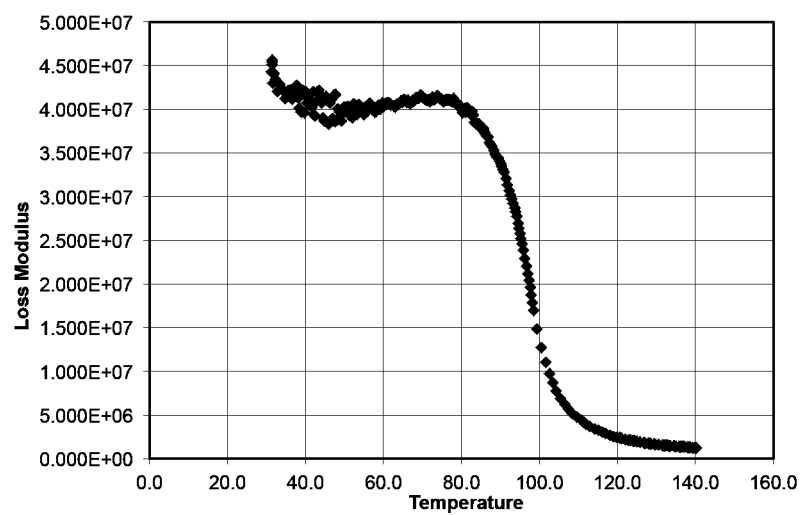
FIG. 22 depicts the loss modulus determined by dynamic mechanical analysis of a cured resin formulated with imine-linked oligomers and a crosslinking agent, according to an embodiment. The imine-linked oligomers were prepared by combining bioderived 2,5-diformylfuran and diamine precursors.

FIG. 22 depicts the loss modulus determined by dynamic mechanical analysis of a cured resin formulated with imine-linked oligomers and a crosslinking agent. The imine-linked oligomers were prepared by combining bioderived 2,5-diformylfuran and diamine precursors.

Figure 23:
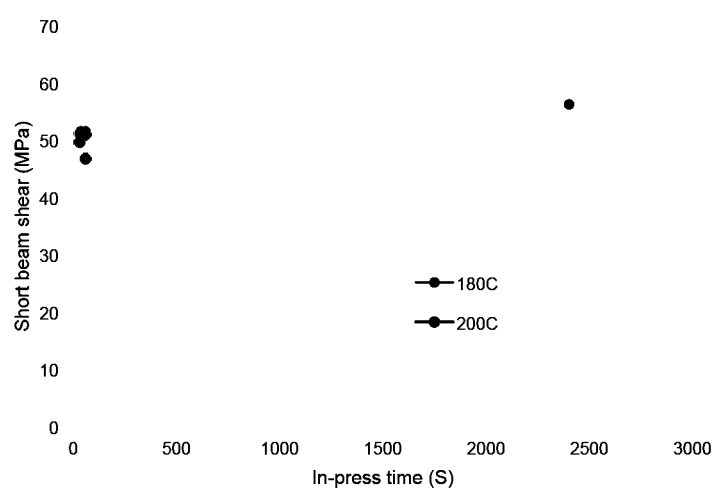
FIG. 23 reports the short beam shear strength of multi-layer composite devices prepared by compression molding at 270 psi at the temperatures and times shown, according to multiple embodiments.

FIG. 23 reports the short beam shear strength of multilayer composite devices prepared by compression molding at 270 psi at the temperatures and times shown. The individual plies comprised carbon fiber and fully cured resin made using an imine-linked oligomer and an epoxy functionalized crosslinking agent. Less than 10% separates the performance of a device pressed for 30 s and one pressed for 2400 s.

Figure 24:
FIG. 24 is a photograph that shows the reprocessing/recycling of a multilayer cured carbon fiber composite device made using a resin made from an imine-linked oligomer and an epoxy functionalized curing agent, according to an embodiment.
Figure 25:
FIG. 25 is a photograph that shows the bare woven fiber from FIG. 24 removed from the solution.

FIG. 24 is a photograph that shows the reprocessing/recycling of a multilayer cured carbon fiber composite device made using a resin made from an imine-linked oligomer and an epoxy functionalized curing agent. The yellow fluid in the vial is the oligomerized resin which has been reacted for 24 h with an excess of diamine monomer in solution at room temperature. The woven fiber in the solution is largely free of the cured resin which originally encased it, FIG. 25 is a photograph that shows the bare woven fiber from FIG. 24 removed from the solution. Only a minimal amount of residual resin remains, which is easily removed by an ethanol rinse and mild scraping.

Figure 26:
FIG. 26 is a photograph that shows a moderately cross-linked imine-epoxy network, containing 5 wt % epoxy crosslinker that was extruded at 180° C. into a filament with a diameter of 1.75 mm, according to an embodiment.

FIG. 26 is a photograph that shows a moderately crosslinked imine-epoxy network, containing 5 wt % epoxy crosslinker that was extruded at 180° C. into a filament with a diameter of 3 mm. Extrusion of the imine-linked resin was through a benchtop extruder. This demonstrates the processability of non-crosslinked, and minimally crosslinked imine-linked resins in the molten state.

Figure 27:
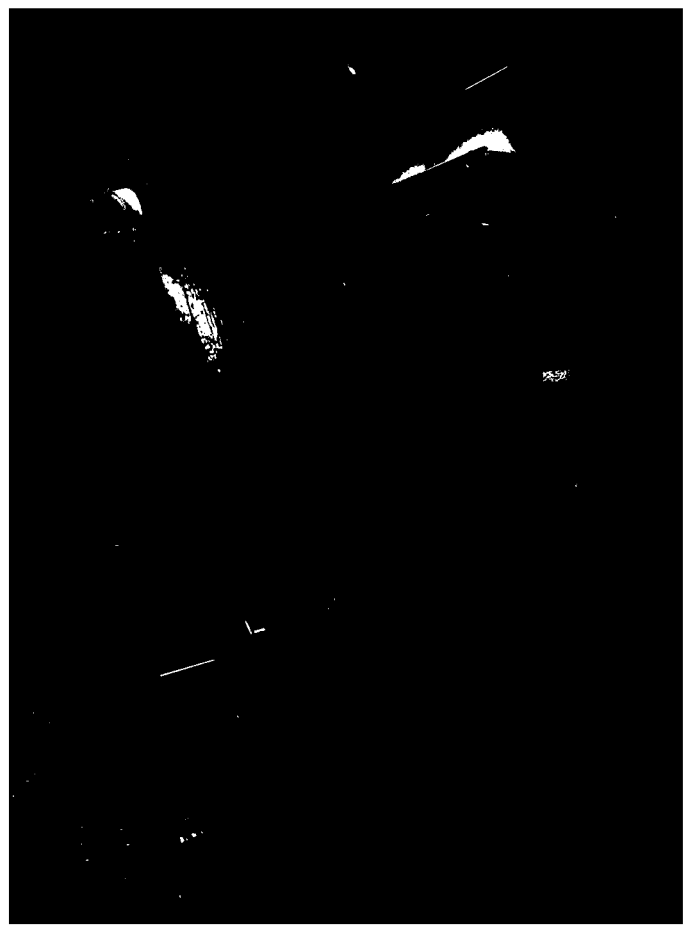
FIG. 27 is a photograph which shows a thin film of a hotmelt resin formulation (2 kg) (which was prepared by the combination of an imine-linked oligomer (1.6 kg) and an epoxy resin (0.4 kg) crosslinker), according to an embodiment.

FIG. 27 is a photograph which shows a thin film of a hotmelt resin formulation (2 kg) (which was prepared by the combination of an imine-linked oligomer (1.6 kg) and an epoxy resin (0.4 kg) crosslinker). The resin was heated to 80° C., and poured into the nip between a meter roller and applicator roller in a typical reverse-roll coating to form a thin film in a roll-to-roll process using silicone-coated paper as the substrate. This demonstrates that imine-linked oligomers can be combined with crosslinking agents and processed into thin films prior to cure. This is a critical step in the efficient production of composite laminates and many other materials and devices.

Figure 28:
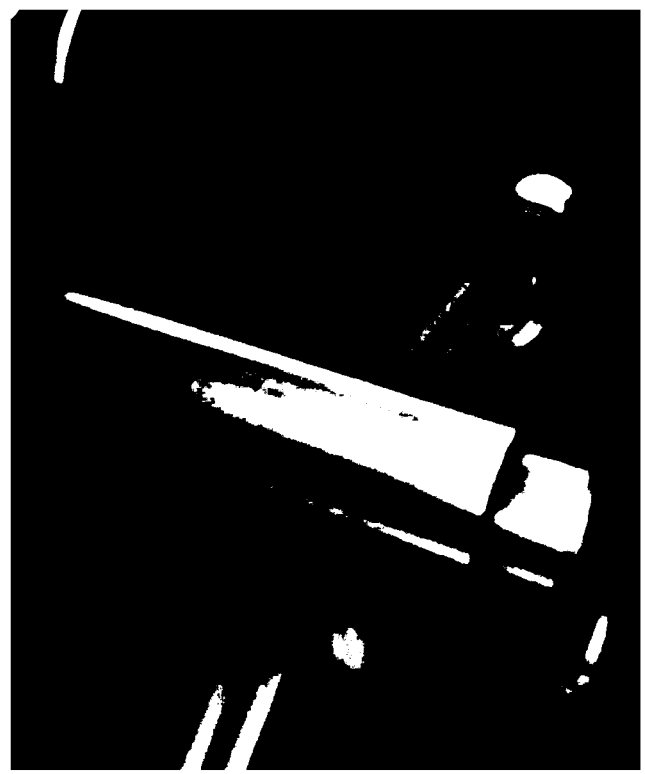
FIG. 28 is a photograph which shows the production of a towpreg material by application of melted resin (which was prepared by the combination of an imine-linked oligomer (1.6 kg) and an epoxy resin (0.4 kg) crosslinker) to a tow of 6K carbon fiber, which was subsequently passed through a die, cooled, and wound, according to an embodiment.

FIG. 28 is a photograph which shows the production of a towpreg material by application of melted resin (which was prepared by the combination of an imine-linked oligomer (1.6 kg) and an epoxy resin (0.4 kg) crosslinker) to a tow of 6K carbon fiber, which was subsequently passed through a die, cooled, and wound. FIG. 28 is a photograph of the tow of carbon fiber being pulled through a die after being coated in molten resin. This demonstrates the flexibility of imine-linked oligomers+crosslinking agents to accommodate a variety of processing conditions and production processes. Towpregs like the one produced in this photograph are used to make composite pressure vessels, tape laminates, and many other products. Towpregs are also used for continuous fiber additive manufacturing.

Figure 29:
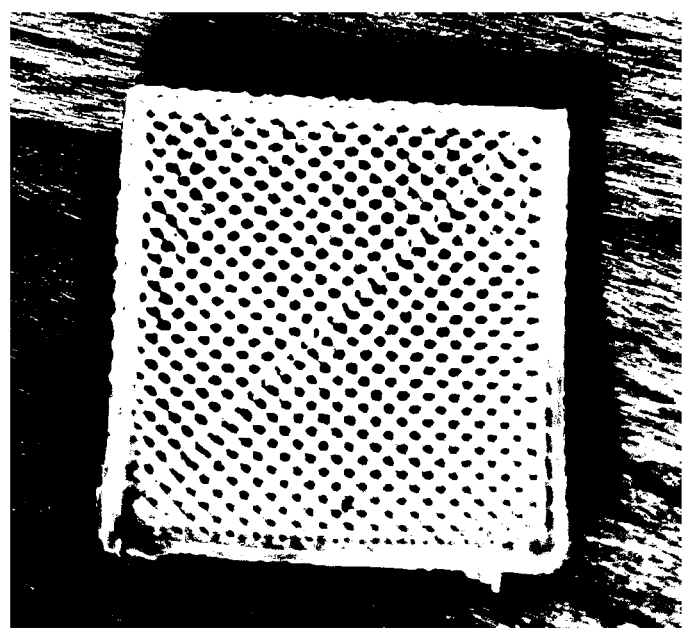
FIG. 29 is a photograph of a 2 cm×2 cm×0.3 cm component which was 3D printed using a filament extrusion 3D printer from the imine-epoxy filament produced by extrusion, as shown in FIG. 26.

FIG. 29 is a photograph of a 2 cm×2 cm×0.3 cm component which was 3D printed using a filament extrusion 3D printer from the imine-epoxy filament produced by extrusion, as shown in FIG. 26. This demonstrates the processability, and reprocessability (extrusion of a previously extruded filament) of imine-linked materials. Additionally, the reprocessability of imine-linked materials through bond exchange opens the possibility of covalent bonding across interfaces between lithographic layers.

Manufacturing and Joining Methods

Composite structures and composite components can be manufactured by a variety of methods. For example, a composite structure can be manufactured by hot compression molding pre-cured composite sheet stock (see Example 3).

Further, composite components can be joined with other composite or non-composite components. In an embodiment, a method of joining composite components comprises applying localized energy (including but not limited to: heat, convection, IR, laser, microwave, electromagnetic induction, sonic energy) and pressure to a contact point(s) between the components to generate a weld by vitrimer interaction. In an embodiment, method of joining composite components comprises applying localized ultrasonic energy and pressure to a contact point(s) between the components to generate a weld by vitrimer interaction. In an embodiment, a method of joining a vitrimer-containing component with a thermoplastic-containing component comprises applying localized ultrasonic energy to a contact point(s) between the components to generate a weld. In an embodiment, a method of joining a vitrimer-containing component with a metal component comprises using a vitrimer-containing structural adhesive. In an embodiment, a method of joining non-vitrimeric components, such as metals, thermoplastics, composites, ceramics and glasses, comprises using a vitrimer-containing structural adhesive.

Electronics

Historically, recycling electronics is particularly difficult because the material used to support and encapsulate metals and semiconductors is typically an irreversibly formed epoxy matrix material. However, the covalent network polymers disclosed herein, can be used in electronics to facilitate recycling. For example, the covalent network polymers (vitrimers) disclosed herein can be used in electronics as:

- A circuit board substrate comprising fibers, fillers, and/or additives
- A circuit board substrate which can be re-processed by heat, pressure, or ultrasonic treatment
- A circuit board substrate which, when reprocessed, becomes a multi-layer circuit board
- A circuit board substrate which, when reprocessed, becomes curved
- A potting material
- An adhesive for electronic applications
- A microchip substrate or encapsulation material
- An electrically insulating coating for electronic applications
- A thermally insulating coating
- A thermally conductive coating When these epoxy materials are replaced by the covalent network polymers disclosed herein electronics can be easily recycled by dissolving the covalent network polymers, e.g., by adding more of one of the precursors to oligomerize and liquify the resin, and recovering the solid metallic and semiconductor components, e.g., by filtration. The resin solution can be used in the manufacture of more resin with identical mechanical properties. For example, a method of recycling electronic components comprising the covalent network polymers disclosed herein may include treatment with a solution containing a stoichiometric excess of a vitrimer precursor (such as a primary amine) to cause the vitrimer resin to oligomerize and soften or become soluble. Depolymerization is then followed by physical separation of other components and materials, including components and subcomponents comprising metals, thermoplastics, thermosets, composites, ceramics, glasses, fibers, fillers, additives and the like. Further chemical processing of the depolymerized vitrimer solution can be performed to isolate vitrimer oligomers, monomers, additives, fillers, surfactants, etc.

Another method of recycling electronic components comprising the covalent network polymers disclosed herein includes treatment with an acid solution to cause the vitrimer resin to depolymerize followed by physical separation of heterogenous components and materials, and optionally further chemical processing of the depolymerized vitrimer solution.

The methods for recycling electronic components disclosed above are also applicable for non-electronic parts comprising a mixture of covalent network polymer and heterogenous materials. For example, the covalent network polymers (vitrimers) disclosed herein can be used in structural parts, such as in the primary or secondary structure of a vehicle intended for marine, automotive, aerospace, shipping or other locomotive applications. These structural parts may be recycled by the addition of acid or excess precursor and physical separation, as decribed above.

Crash Energy Management Materials

Composite structures where the matrix material comprises a covalent network polymer are capable of covalent bond exchange at elevated temperature, which allows the composite structures to be used for crash energy management (CEM). The composite CEM structures are designed to optimize the specific sustained crushing force during a crash event. For example, composite CEM structures can be designed for optimal CEM for low speed collisions (0-10 mph), medium speed collisions (11-35 mph), high speed collisions (36+ mph), and/or racing applications (100+ mph). Exemplary composite CEM structures comprise bumpers, pillars, side impact protection parts, rear impact protection parts, and any other structural component of a crash energy management system.

A composite structure is designed for CEM where at certain strain rates (impact speeds), a low strain fiber (such as carbon fiber) exhibits brittle failure, while the resin restricts brittle failure, extending the sustained crushing force, and at other strain rates, the resin matrix exhibits brittle failure, and high strain fibers (such as glass fiber, UHMWPE fiber, hemp or other natural fiber, metal fiber such as steel or aluminum, or other synthetic fiber such as aramid fiber) act to restrict brittle failure and extend the sustained crushing force. A composite CEM structure can contain low strain fibers, high strain fibers, or both low strain and high strain fibers.

The compositions and methods disclosed herein are further illustrated by the following Examples. These Examples are for illustrative purposes only and are not intended to limit the invention.

EXAMPLE 1

This Example illustrates the synthesis of exemplary covalent network polymers.

(a) Imine-linked oligomers were formed through condensation of diamine and dicarbonyl precursors followed by annealing at elevated temperature to remove water.

(b) Imine-linked oligomers, prepared via room temperature mixing, as described above, were combined with a crosslinking agent capable of forming a covalent network polymer when combined with the imine-linked oligomers. At least one of the following processes of combining the crosslinking agent and the imine-linked oligomers was used: reactive extrusion, reactive injection molding, shear mixing, Meyer rod coating, blade coating, slot die coating and/or lithography.

(c) The covalent network polymer formed in (b) was cured by heating, UV treatment, IR treatment, microwave treatment, and/or addition of a catalyst, accelerant or radical initiator.

A non-limiting case of Example 1 is given below in the preparation of amine-terminated imine-linked oligomer (1) below, and it's subsequent reaction with the epoxy crosslinking agent shown.

0.706 mol 0.099 mol 0.445 mol 0.445 mol

1. EtOH, 60 C., Stir
2. RT, Mol Sieves
3. Evaporate Solvent

-continued

Amine-terminated Imine-
Linked Oligomers
1

Oligomer Synthesis Procedure

Terephthaldehyde (94.7 g, 0.706 mol) was added to a dry 500 mL Erlenmeyer flask, followed by 200 mL EtOH solvent, and the mixture was stirred for 5 minutes until most of the terephthaldehyde was dissolved. Separately, diethylenetriamine (10.2 g, 0.099 mol), 4,4'-methylenebis(cyclohexylamine) (93.6 g, 0.445 mol), and 1,6-diamino-2,2,4(2,4,4)-trimethylhexane (70.4 g, 0.445 mol) were combined and hand stirred until thoroughly mixed. The amine mixture was added portion-wise over a period of 10 minutes, and temperature of the solution was monitored by thermocouple. The temperature of the solution reached a temperature of 60° C. during the addition. Subsequently, the reaction vessel was allowed to cool to RT, and the solution was treated with activated molecular sieves (100 g), followed by decanting and rinsing of the sieves with ethanol. The decanted solution was combined with the rinses, and the solvent was evaporated by rotovap to leave a yellow-orange elastomeric solid (240 g).

iii. Forming a three-dimensional shape by injection molding and/or 3D printing.

After or during (i), (ii) or the covalent network polymer was cured by heating, UV treatment, IR treatment, microwave treatment and/or addition of a catalyst or accelerant.

Non-Limiting Case of Example 2

A hotmelt resin formulation (2 kg) (which was prepared by the combination of an imine-linked oligomer (1.6 kg) and an epoxy resin (0.4 kg) crosslinker) was heated to 80° C., and poured into the nip between a meter roller and applicator roller in a typical reverse-roll coating to form a thin film in a roll-to-roll process using silicone-coated paper as the substrate. This thin film was subsequently combined with carbon fiber fabric (12k twill weave), and passed through two heated (80° C.) compaction rollers to form a pre-impregnated carbon fiber laminate. The laminate was subsequently cured, and then combined into a multi-layer device via heated compression forming (150° C., 5 minutes, 500 psi). The multilayer composite device was found to have an interlaminar shear strength (ASTM D2344) of 76 MPa.

Non-Limiting Case of Example 2-b

An imine-linked oligomer was extruded at 140° C. into a filament with a diameter of 1.75 mm. The filament was

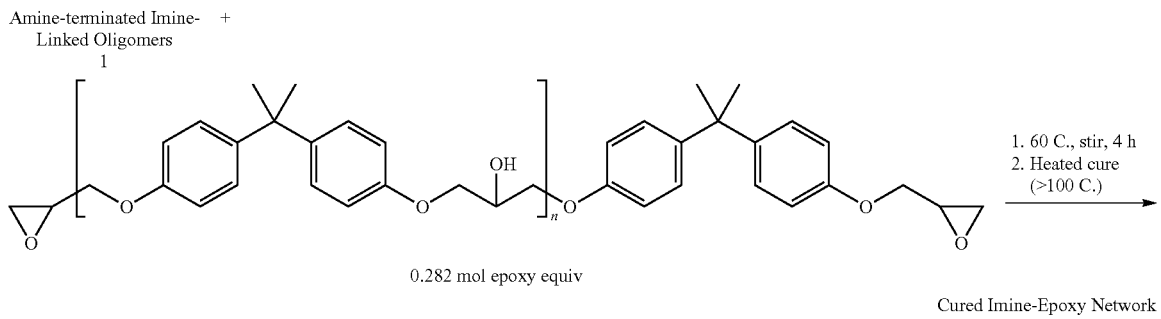

Cured Epoxy Imine Network Synthesis Procedure

The imine-linked oligomer obtained above (240 g) was heated to 60° C. while stirring, a viscous melt. To this was added a 60° C. melt of epoxy resin Epon 828 (106 g). The reaction mixture was stirred thoroughly and then cast in silicone molds and oven-cured at 150° C. for 3 hours. A hard glossy orange solid was obtained with a Tg (Tan Delta) of 143° C., and a moisture uptake (2 hour boil per ASTM D6980) of 1.5%.

EXAMPLE 2

The reactive mixture from (b) of Example 1 was processed by:
i. Impregnating the reactive mixture into a woven, non-woven, unidirectional, chopped or shredded fibrous material via extrusion followed by compaction, pultrusion, slot die coating, solvent dip impregnation, ball milling and/or hot melt impregnation.
ii. Forming a film (either stand-alone, supported by a release liner, or as a component of a multilayered device) by extrusion, slot die coating, gravure coating, Meyer rod coating, slide coating, polishing rod coating, and/or a lithographic technique.

loaded into a filament extruder 3D printer. The 3D printer was used to print a part with the dimensions 2 cm×2 cm×0.3 cm.

Non-Limiting Case of Example 2-c

An imine-linked oligomer was co-extruded with ABS plastic at 180° C. into a filament with a diameter of 1.75 mm. The filament was loaded into a filament extruder 3D printer. The 3D printer was used to print a part with the dimensions 2 cm×2 cm×0.3 cm.

Non-Limiting Case of Example 2-d

A moderately crosslinked imine-epoxy network, containing 5 wt % epoxy crosslinker was extruded at 180° C. into a filament with a diameter of 1.75 mm. The filament was loaded into a filament extruder 3D printer. The 3D printer was used to print a part with the dimensions 2 cm×2 cm×0.3 cm.

EXAMPLE 3

This Example illustrates a method for compression molding a covalent network polymer and carbon fiber to form a composite solid object and characterization of the composite.

In some embodiments, multilayer composite structures, comprising dynamic covalent network polymers and reinforcing fibers, may not be practically remoldable. As shown in FIG. 15, fully pre-cured unidirectional carbon fiber composite plies were made by impregnating carbon fiber with resin, formed of imine-linked oligomers and an epoxy functionalized crosslinker, then curing. These plies, which contained approximately 40% resin and 60% fiber by weight, were aligned so the unidirectional fibers were all parallel, and multiple layers were combined via compression forming at 150° C. (50° C. above the material's glass transition temperature). The resulting material was aligned so that fiber direction would be parallel with flexural direction and cut into the dimensions appropriate for ASTM D648-16 Method B "deflection temperature of plastics under flexural load in the edgewise position". The result of the deflection testing was a heat deflection temperature for the material which exceeded 300° C. Likely due to interlaminar shear forces, when fiber direction is aligned with the direction of a force within a multilayer device, the composite remains not practically moldable even hundreds of degrees Celsius above the glass transition temperature of the resin.

As shown in FIG. 23, when a fully cured covalent network polymer, formed by the reaction of an imine-linked oligomer and an epoxy functionalized crosslinking agent, was compression molded with carbon fiber at 270 psi at the temperatures and times shown, a difference of less than 10% in short beam shear strength separates the performance of a device pressed for 30 s and one pressed for 2400 s. Such a drastic decrease in production time translates into significant manufacturing cost savings.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods and devices useful for the present methods and devices can include a large number of optional composition and processing elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a molecule" includes a plurality of such molecules and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A covalent network polymer prepared from an anhydrous mixture of an imine-linked oligomer and an independent crosslinker comprising reactive moieties selected from the group consisting of epoxy, isocyanate, bismaleimide, sulfide, polyurethane, anhydride, polyester and combinations thereof.

2. The covalent network polymer of claim 1, wherein the imine-linked oligomer comprises one or more primary and/or secondary and/or tertiary amines and the amines and the crosslinkers are present in a molar ratio between 0.01:1 and 100:1.

3. The covalent network polymer of claim 1, wherein the imine-linked oligomer comprises secondary amines within the oligomer backbone.

4. The covalent network polymer of claim 1, wherein the imine-linked oligomer is prepared from a monofunctional or polyfunctional amine and a monofunctional or polyfunctional carbonyl.

5. The covalent network polymer of claim 4, wherein the polyfunctional carbonyl is selected from the group consisting of terepthaldehyde, 2,5-diformylfuran, diformylthiophene, diformylpyrrole, diformylimidazole and combinations thereof.

6. The covalent network polymer of claim 1, wherein the crosslinker is a molecule selected from the group consisting of a novolac resin, a bisphenol, a monoglycidyl, diglycidyl or triglycidyl molecule, a N-containing triglycidyl molecule, cresol or an SU-8 photoresist functionalized with an epoxy, an isocyanate, a bismaleimide, a sulfide, a polyurethane, an anhydride and/or a polyester.

7. The covalent network polymer of claim 1, wherein the covalent network polymer is a vitrimer and a thermosetting polymer.

8. The covalent network polymer of claim 1, wherein the covalent network polymer is characterized by a glass transition temperature of at least 60° C.

9. A composite comprising the covalent network polymer of claim 1 and another material.

10. The composite of claim 9, wherein the composite is characterized by a glass transition temperature of at least 100° C.

11. A process for forming a covalent network polymer comprising:
combining an imine-linked oligomer and an independent crosslinker having reactive moieties selected from the group consisting of epoxy, isocyanate, bismaleimide, sulfide, polyurethane, anhydride, polyester and combinations thereof, wherein reaction of the imine-linked oligomer and the crosslinker is anhydrous.

12. The process of claim 11, wherein the imine-linked oligomer comprises one or more primary and/or secondary and/or tertiary amines and the amines and the crosslinkers are present in a molar ratio between 0.01:1 and 100:1.

13. The process of claim 11, wherein the step of combining occurs by mechanical stirring, reactive extrusion, reactive injection molding, slot die coating and/or shear mixing.

14. The process of claim 11 further comprising a step of using the covalent network polymer to:
(i) impregnate a woven, non-woven, unidirectional, chopped or shredded fibrous material;
(ii) form a film; or
(iii) form a three-dimensional object.

15. The process of claim 14, wherein the fibrous material is impregnated by extrusion followed by compaction, pultrusion, slot die coating, solvent dip impregnation and/or hot melt impregnation.

16. The process of claim 14, wherein the film is a stand-alone film or the film is supported on a release liner or the film is a layer in a multilayered device.

17. The process of claim 14, wherein the film is formed by extrusion, slot die coating, gravure, Mayer rod, slide, polishing rod and/or lithography.

18. The process of claim 14, wherein the three-dimensional object is formed by injection molding, additive manufacturing, laser cutting and/or CNC machining.

19. The process of claim 14 further comprising curing the covalent network polymer.

* * * * *